United States Patent
Kyushin et al.

(10) Patent No.: US 10,844,178 B2
(45) Date of Patent: Nov. 24, 2020

(54) METHOD FOR PRODUCING ORGANIC POLYSILANE

(71) Applicant: Nippon Soda Co., Ltd., Tokyo (JP)

(72) Inventors: Souichiro Kyushin, Kiryu (JP); Kenichi Hayashi, Joetsu (JP)

(73) Assignee: Nippon Soda Co., Ltd., Tokyo (JP)

( * ) Notice: Subject to any disclaimer, the term of this patent is extended or adjusted under 35 U.S.C. 154(b) by 254 days.

(21) Appl. No.: 16/082,037

(22) PCT Filed: Mar. 21, 2017

(86) PCT No.: PCT/JP2017/011148
§ 371 (c)(1),
(2) Date: Sep. 4, 2018

(87) PCT Pub. No.: WO2017/179369
PCT Pub. Date: Oct. 19, 2017

(65) Prior Publication Data
US 2020/0332068 A1    Oct. 22, 2020

(30) Foreign Application Priority Data

Apr. 11, 2016 (JP) ................................. 2016-078909

(51) Int. Cl.
C08G 77/24 (2006.01)
C08G 77/60 (2006.01)
C08G 77/34 (2006.01)
C08G 77/08 (2006.01)

(52) U.S. Cl.
CPC ............. *C08G 77/24* (2013.01); *C08G 77/08* (2013.01); *C08G 77/34* (2013.01); *C08G 77/60* (2013.01)

(58) Field of Classification Search
CPC .................................. C08G 77/60; C07F 7/12
See application file for complete search history.

(56) References Cited

U.S. PATENT DOCUMENTS

| | | | | |
|---|---|---|---|---|
| 5,532,288 A * | 7/1996 | Beziers | ................. | C08F 290/06 428/391 |
| 2009/0156775 A1 * | 6/2009 | Sakamoto | ............ | C09D 183/16 528/30 |
| 2009/0169457 A1 | 7/2009 | Auner et al. | | |
| 2011/0071269 A1 | 3/2011 | Oohata et al. | | |
| 2015/0018506 A1 | 1/2015 | Hayashi et al. | | |

FOREIGN PATENT DOCUMENTS

| | | |
|---|---|---|
| CN | 101522759 A | 9/2009 |
| CN | 102027045 A | 4/2011 |
| JP | 06-271678 A | 9/1994 |
| JP | 07-113010 A | 5/1995 |
| JP | 07-179609 A | 7/1995 |
| JP | 08-113650 A | 5/1996 |
| JP | 10-237177 A | 9/1998 |
| WO | WO 2009/142161 A1 | 11/2009 |
| WO | WO 2013/133100 A1 | 9/2013 |

OTHER PUBLICATIONS

Skryshevski et al. (Optical Materials, 30(3) (2007) 384-392).*
Supplementary European Search Report dated Oct. 24, 2019, in EP 17782187.3.
Skryshevski et al., "Triplet state spectroscopy of sigma-conjugated poly[methyl(phenyl)silylene]," Optical Materials, Feb. 6, 2007, 30(3):384-392.
International Search Report dated Jun. 20, 2017, in PCT/JP2017/011148.
Office Action dated Jun. 23, 2020, in CN 201780021621.X, with English translation.
Organosilicon Monomer and Polymer, compiled by Organosilicon Compilation Group of Chenguang Chemical Research Institute, Chemical Industry Press, 1st Edition, Dec. 1986, p. 31.

* cited by examiner

*Primary Examiner* — Kuo Liang Peng
(74) *Attorney, Agent, or Firm* — Foley & Lardner LLP

(57) ABSTRACT

An organic polysilane, which can produce signals respectively derived from a Si—O bond, an alkoxy group and a hydroxy group at levels equal to or lower than the detection limits in $^{29}$Si and $^{13}$C CP/MAS NMR analysis, can be produced by a method which includes: polymerizing an organic dihalosilane in an aprotic solvent in the presence of an alkali metal and/or an alkali earth metal to produce a mixture containing an organic polysilane having a terminal halogeno group; adding a solution containing an organic lithium compound and an aprotic polar solvent to the mixture to inactivate the organic polysilane having the terminal halogeno group; and then adding a protic polar solvent to the resultant mixture to deactivate the alkali metal and/or the alkali earth metal.

12 Claims, 2 Drawing Sheets

METHOD FOR PRODUCING ORGANIC POLYSILANE

TECHNICAL FIELD

The present invention relates to a method for producing an organic polysilane. More specifically, the present invention relates to a method for producing an organic polysilane, which can produce signals respectively derived from a Si—O bond, an alkoxy group and a hydroxy group at levels equal to or lower than the detection limits in $^{29}$Si and $^{13}$C CP/MAS NMR analysis.

This application is a National Stage application of PCT/JP/2017/011148, filed Mar. 21, 2017, which claims priority on the basis of Japanese Patent Application No. 2016-078909 filed in Japan on Apr. 11, 2016, the contents of which are incorporated herein by reference.

BACKGROUND OF THE INVENTION

Polydialkyl silane has been studied as a photo•electronic functional material used in precursors of silicon carbide materials, organic photosensitive members, optical waveguides, optical memories, or the like. The polydialkylsilane is obtained by polymerizing dialkyldihalosilane in the presence of an alkali metal (Wurtz-type coupling). Water or alcohol is added to the reaction solution containing polydialkylsilane to deactivate the alkali metal to extract polydialkylsilane therefrom.

Incidentally, polydialkylsilane contained in the reaction solution immediately after the polymerization reaction has terminal halogeno groups. The terminal halogen groups are presumably hydrolyzed with water or alcohol to be replaced with hydroxyl groups or alkoxy groups as shown in formula (A) or formula (B). In addition, it is assumed that there is a case where a siloxane bond is formed by hydrolysis of terminal halogeno groups and dialkyldihalosilane as shown in formula (C) (Patent Document 1).

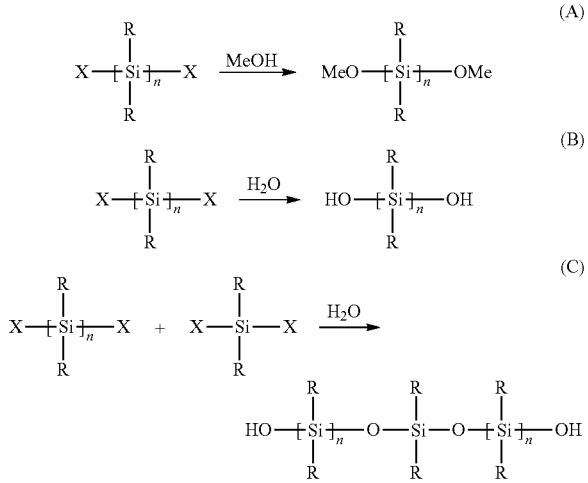

Patent Documents 2 and 3 disclose methods for blocking terminal active groups of polysilane, including adding an organic lithium compound or an organic magnesium halide compound (Grignard reagent) to a solution containing polysilane immediately after conducting Wurtz-type coupling.

In addition, Patent Document 4 discloses a method for producing a substituted polysilane by reacting a polysilane having a hydrogen group with an organic lithium compound in the presence of an organic solvent.

DOCUMENTS OF RELATED ART

Patent Documents

Patent Document 1: Japanese Unexamined Patent Application Publication No. Hei 10-237177
Patent Document 2: Japanese Unexamined Patent Application Publication No. Hei 7-113010
Patent Document 3: Japanese Unexamined Patent Application Publication No. Hei 7-179609
Patent Document 4: Japanese Unexamined Patent Application Publication No. Hei 8-113650

SUMMARY OF THE INVENTION

Problems to be Solved by the Invention

An object of the present invention is to provide a method for producing an organic polysilane, which can produce signals respectively derived from a Si—O bond, an alkoxy group and a hydroxy group at levels equal to or lower than the detection limits in $^{29}$Si and $^{13}$C CP/MAS NMR analysis.

Means to Solve the Problems

As a result of intensive studies to solve the above problems, the present invention including the following aspects has been completed.

[1] A method for producing an organic polysilane, including:
polymerizing an organic dihalosilane in an aprotic solvent in the presence of an alkali metal and/or an alkali earth metal to obtain a mixture containing an organic polysilane having a terminal halogen group;
adding a solution containing an organic lithium compound and an aprotic polar solvent to the mixture to inactivate the organic polysilane having the terminal halogen group; and then
adding a protic polar solvent thereto to deactivate the alkali metal and/or the alkali earth metal.

[2] The production method according to [1], wherein the organic lithium compound is an alkyl lithium.

[3] The production method according to [1] or [2], wherein the organic dihalosilane is dimethyldichlorosilane or diphenyldichlorosilane.

[4] The production method according to any one of [1] to [3], wherein the aprotic polar solvent is diethyl ether.

[5] The production method according to any one of [1] to [4], further including:
conducting solid-liquid separation after deactivating the alkali metal and/or the alkali earth metal;
washing, with water, a solid content separated;
separating, from water, the solid content washed with water;
washing, with an alcohol, the solid content separated from water;
separating, from the alcohol, the solid content washed with the alcohol;
washing, with an aprotic solvent, the solid content separated from the alcohol;
separating, from the aprotic solvent, the solid content washed with the aprotic solvent;
washing, with another alcohol, the solid content separated from the aprotic solvent;

separating, from the alcohol, the solid content washed with the alcohol; and then drying the solid content.

[6] The production method according to any one of [1] to [5], wherein the aprotic solvent is toluene.

Effects of the Invention

The production method according to the present invention makes it possible to obtain an organic polysilane, which can produce signals respectively derived from a Si—O bond, an alkoxy group and a hydroxy group at levels equal to or lower than the detection limits in $^{29}$Si and $^{13}$C CP/MAS NMR analysis.

EMBODIMENTS FOR CARRYING OUT THE INVENTION

Figure 1:
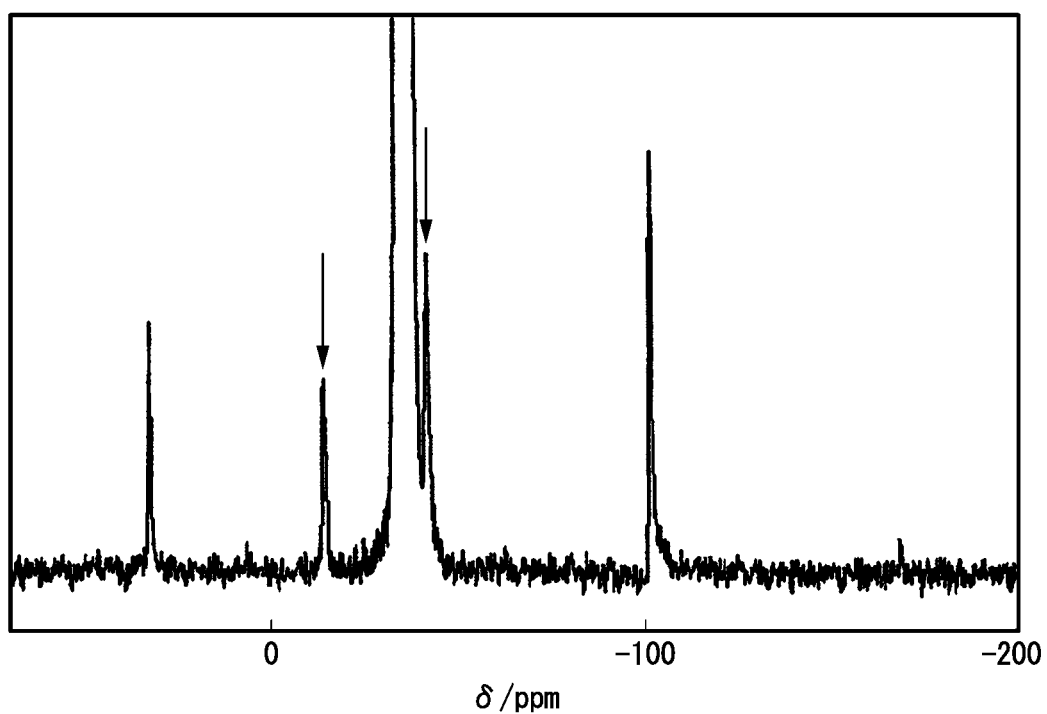
FIG. 1 is a drawing that indicates $^{29}$Si and $^{13}$C CP/MAS NMR analysis chart of an organic polysilane obtained in Example 1.

A method for producing an organic polysilane according to the present invention includes: polymerizing an organic dihalosilane in an aprotic solvent in the presence of an alkali metal and/or an alkali earth metal to obtain a mixture containing an organic polysilane having a terminal halogeno group; adding a solution containing an organic lithium compound and an aprotic polar solvent to the mixture to inactivate the organic polysilane having the terminal halogeno group; and then adding a protic polar solvent thereto to deactivate the alkali metal and/or the alkali earth metal.

The organic dihalosilane available in the present invention is a silane substituted with an organic group and two halogeno groups. Examples of the organic dihalosilane include: dimethyldichlorosilane, diethyldichlorosilane, di-n-propyldichlorosilane, di-i-propyldichlorosilane, di-n-butyldichlorosilane, di-n-pentyldichlorosilane, di-n-hexyldichlorosilane, dimethyldibromosilane, diethyldibromosilane, di-n-propyldibromosilane, di-i-propyldibromosilane, di-n-butyldibromosilane, di-n-pentyldibromosilane, di-n-hexyldibromosilane, hexylmethyldichlorosilane, ethylmethyldichlorosilane; phenylmethyldichlorosilane, and diphenyldichlorosilane. Among these, dimethyldichlorosilane and diphenyldichlorosilane are preferable, and dimethyldichlorosilane is more preferable. The organic dihalosilane available in the present invention may be one synthesized by a known method, or may be commercially available one.

Examples of the alkali metal available in the present invention include a lithium simple substance, a sodium simple substance, a potassium simple substance, or alloys thereof. Among these, a sodium simple substance is preferable. Examples of the alkali earth metal available in the present invention include a magnesium simple substance, a calcium simple substance, a strontium simple substance, and alloys thereof. Among these, a magnesium simple substance is preferable.

Although the amount of the alkali metal and/or the alkaline earth metal to be used is not particularly limited, the amount, with respect to 1 mol of the organic dihalosilane, is preferably from 2.0 to 5.0 mol, and more preferably 2.0 to 3.0 mol. In the case where the amount of the alkali metal and/or the alkaline earth metal is small, there is a tendency that the reaction rate decreases. In the case where the amount of the alkali metal and/or the alkaline earth metal is too much, there is a tendency that the production cost is increased by increasing the amount of the alkali metal and/or the alkaline earth metal remaining after completion of the reaction.

Examples of the aprotic solvent available in the present invention include: aromatic hydrocarbon-based solvents such as benzene, toluene, xylene, and mesitylene; ether-based solvents such as tetrahydrofuran, 2-methyltetrahydrofuran, 1,4-dioxane, anisole, 1,2-dimethoxyethane, diethylene glycol dibutyl ether, diethylene glycol diethyl ether, diethyl ether, diisopropyl ether, and t-butylmethyl ether; and aliphatic hydrocarbon-based solvent such as hexane, heptane, octane, and decane. These may be used alone or in combination with at least two thereof. Among these, the aromatic hydrocarbon solvents are preferable, toluene and xylene are more preferable, and toluene is even more preferable.

Polymerization is preferably conducted by dispersing an alkali metal and/or an alkali earth metal in an aprotic solvent and adding an organic dihalosilane to the resultant dispersion while conducting stirring. The organic dihalosilane may be added to the resultant dispersion in a state of a solution obtained by diluting the organic dihalosilane with the aprotic solvent, or may be added thereto directly without conducting dilution.

The addition of the organic dihalosilane is preferably conducted under the conditions satisfying 0.010 [mol·hr$^{-1}$] ≤an average addition rate [mol·hr$^{-1}$] of the organic dihalosilane/the amount of the alkali metal and/or the alkali earth metal [mol]≤0.055 [mol·hr$^{-1}$], and more preferably 0.010 [mol·hr$^{-1}$]≤an average addition rate [mol·hr$^{-1}$] of the organic dihalosilane/the amount of the alkali metal and/or the alkali earth metal [mol]≤0.050 [mol·hr$^{-1}$]. The addition of the organic dihalosilane under the conditions makes it possible to suppress the by-production of compounds having a Si—O bond. The average addition rate of the organic dihalosilane is a value obtained by dividing the total amount of the organic dihalosilane used [mol] by the addition time thereof [hr]. The addition time of the organic dihalosilane is a time [hr] until the completion of the addition of the organic dihalosilane from the initiation of the addition thereof. Although the addition of the organic dihalosilane may be conducted continuously or intermittently, it is preferable that the addition be conducted continuously in terms of production efficiency.

Although the polymerization of an organic dihalosilane in the presence of an alkali metal and/or an alkali earth metal may be conducted at any temperature, it is preferable that the polymerization be conducted at a temperature from 98° C. to a reflux temperature of a solvent. The polymerization is preferably conducted in an inert gas atmosphere such as nitrogen. In addition, the polymerization may be conducted under ordinary pressure or increased pressure. The stirring process may be continued for 1 to 24 hours, and more preferably 1 to 12 hours, at the above-mentioned polymerization temperature, after the completion of the addition of the organic dihalosilane, so as to increase the polymerization conversion rate.

A mixture containing an organic polysilane having a terminal halogen group is obtained by conducting the above-mentioned polymerization process. The mixture is preferably cooled at approximately 40 to 80° C.

According to the present invention, a solution containing an organic lithium compound and an aprotic polar solvent is added to the mixture containing an organic polysilane having a terminal halogeno group to inactivate the organic polysilane having the terminal halogeno group. The terminal halogeno group of the organic polysilane having a terminal halogeno group tends to be easily hydrolyzed as mentioned above. The terminal halogeno group can be blocked by adding a solution containing an organic lithium compound and an aprotic polar solvent to the mixture.

Examples of the aprotic polar solvent include ether-based solvents such as tetrahydrofuran, 2-methyltetrahydrofuran, 1,4-dioxane, anisole, 1,2-dimethoxyethane, diethylene glycoldibutyl ether, diethylene glycoldiethyl ether, diethyl ether, diisopropyl ether, and t-butylmethyl ether. These may be used alone or in combination with at least two thereof. Among these, diethyl ether is preferable.

As the organic lithium compound available in the present invention, an alkyl lithium is preferable, and C1-6 alkyl lithium such as methyl lithium, ethyl lithium, n-propyl lithium, isopropyl lithium, n-butyl lithium, s-butyl lithium, or t-butyl lithium is more preferable.

Although the amount of the organic lithium compound used is not particularly limited, the amount, with respect to 1 mol of the organic dihalosilane, is preferably 0.05 to 0.3 mol, more preferably 0.1 to 0.25 mol, and even more preferably 0.15 to 0.2 mol.

Although the amount of the aprotic polar solvent used is not particularly limited, the amount, with respect to 1 mol of the organic lithium compound, is preferably 0.67 to 1.25 l, and more preferably 0.77 to 1.00 l.

Then, a protic polar solvent is added to the resultant mixture to deactivate the alkali metal and/or the alkali earth metal. Examples of the protic polar solvent include: alcohols such as methanol, ethanol, isopropyl alcohol, n-propyl alcohol, 2-methylpropyl alcohol, n-butyl alcohol, t-butyl alcohol, and ethylene glycol; and water. Among these, alcohols are preferable, and methanol is more preferable. The addition amount of the protic polar solvent is at least 1 mol, with respect to 1 mol of the remaining alkali metal and/or alkali earth metal.

It is preferable that the alkali metal and/or the alkali earth metal be deactivated by adding alcohol thereto, followed by adding water thereto. The reaction of water with the alkali metal and/or the alkali earth metal is heavy as compared to the reaction of alcohol with the alkali metal and/or the alkali earth metal. The above-mentioned stepwise deactivation suppresses occurrence of defects such as bumping.

It is preferable that a surfactant be dissolved in the protic polar solvent. The presence of the surfactant increases the dispersibility of the organic polysilane having a terminal halogen group, and thus the washing efficiency in the water washing process mentioned below is increased.

Examples of the surfactant available in the present invention include anionic surfactants, cationic surfactants, amphoteric surfactants, and nonionic surfactant.

Examples of the anionic surfactants include: fatty acid salts, alkylbenzenesulfonic acid salts, higher alcohol sulfuric ester salts, polyoxyethylene alkyl ether sulfates, α-sulfo fatty acid esters, α-olefin sulfonates, monoalkyl phosphate ester salts, and alkane sulfonic acid salts.

Examples of the cationic surfactants include: alkyltrimethyl ammonium salts, dialkyldimethyl ammonium salts, and alkyldimethylbenzyl ammonium salts.

Examples of the amphoteric surfactants include: alkylamine oxides, alkyl betaines, alkyl carboxy betaines, and alkylamino fatty acid salts.

Examples of the nonionic surfactants include: polyoxyalkylene alkyl ethers, polyoxyalkylene alkylphenyl ethers, alkylglucosides, polyoxyethylene fatty acid esters, sucrose fatty acid esters, sorbitan fatty acid esters, polyoxyethylene sorbitan fatty acid esters, and fatty acid alkanolamides. It is preferable that an alkyl chain contained in the nonionic surfactant have 8-20 carbon atoms. The alkyl chain may be a straight chain or a branched chain.

Among these, the anionic surfactant or the nonionic surfactant is preferable, the nonionic surfactant is more preferable, and polyoxyethylene propylene alkyl ethers, which are polyoxyalkylene alkyl ethers, or polyoxyethylene propylene alkylphenyl ethers are the most preferable.

Although the surfactant available in the present invention in not particularly limited by HLB, it is preferable that HLB thereof be high. Specifically, it is preferable that HLB be 5 to 20, more preferably 10 to 15, and even more preferably 12 to 15. In addition, although the surfactant available in the present invention is not particularly limited by the cloud point thereof, it is preferable that the cloud point thereof be 0 to 100° C., and more preferably 20 to 95° C. In addition, it is preferable that the cloud point thereof be close to the water temperature in the water washing process mentioned below. Specifically, it is preferable that the cloud point be within a range of ±10° C. of the water temperature in the water washing process, and more preferably within a range of ±5° C. of the water temperature in the water washing process.

The addition amount of the surfactant, with respect to 100 parts by mass of the organic dihalosilane, is preferably 0.05 to 20 parts by mass, and more preferably 0.1 to 7 parts by mass. In the case where the amount of the surfactant is too small, the solid content tends to float, and the washing effects tend to deteriorate. Although a much amount of the surfactant may be added, it is not economical because effects thereof are saturated.

A slurry is obtained by deactivating the alkali metal and/or the alkali earth metal. It is preferable that the obtained slurry be subjected to solid-liquid separation and the separated solid content be washed with water. The solid-liquid separation may be conducted by a known method. Examples of the solid-liquid separation method include distillation, evaporation, filtration, and decantation. Water-soluble components such as surfactants and alkali metal hydroxides are removed by conducting water-washing. The solid content washed with water is separated from water. The water-washing process and the solid-liquid separation process may be conducted only once, or repeated several times. It is preferable that the water-washing process be conducted until the pH of water separated from the solid content be 6 to 8. The water temperature in the water-washing process is preferably 25° C. or higher, and more preferably 40 to 80° C. It is preferable that the water-washing process be conducted by adding water at an ordinary temperature and then heating the resultanta, or conducted by adding hot water.

Next, it is preferable that the solid content separated from water be washed with alcohol. Alcohol-soluble components are removed therefrom by conducting alcohol-washing. The solid content washed with alcohol is separated from alcohol. The alcohol-washing process and the solid-liquid separation process may be conducted only once or may be repeated several times. Examples of the alcohol available in the alcohol-washing process include alcohols mentioned above, and methanol is preferably used.

It is preferable that the solid content separated from alcohol be further washed with an aprotic solvent. Components soluble in the aprotic solvent are removed therefrom by conducting aprotic-solvent-washing. The solid content washed with the aprotic solvent is separated from the aprotic solvent. The aprotic-solvent-washing process and the solid-liquid separation process may be conducted only once or may be repeated several times. Examples of the aprotic solvent available in the aprotic-solvent-washing process include aprotic solvents mentioned above, and toluene is preferably used.

Next, it is preferable that the solid content separated from the aprotic solvent be washed with alcohol. The solid content washed with alcohol is separated from alcohol. The alcohol-washing process and the solid-liquid separation process may be conducted only once or may be repeated several times. Methanol is preferably used in the alcohol-washing process.

Finally, it is preferable that the solid content separated from alcohol be dried. Although the temperature at which the drying process is conducted is not particularly limited, the temperature is preferably 1 to 100° C. The drying process may be conducted under ordinary pressure or reduced pressure.

The organic polysilane obtained by the production method according to the present invention is usually insoluble in organic solvents, acids or alkalis. The molecular weight of the organic polysilane obtained by the production method according to the present invention is not particularly limited. The production method according to the present invention makes it possible to produce an organic polysilane having a suitable molecular weight depending on the intended purpose thereof. For example, the production method according to the present invention makes it possible to produce a polydimethyl silane having a molecular weight in a similar level to a polydimethyl silane which is disclosed in "Development of organic silicon polymer" (supervised by Hideki Sakurai, page 106, CMC Publishing Co., Ltd.) and has a number average molecular weight of 2580 and a weight average molecular weight of 4650. The molecular weight of the organic polysilane can be determined by ultrahigh temperature GPC.

The following shows examples that illustrate the present invention more specifically. The present invention is not limited by the following examples.

Example 1

The inside of a four-necked flask equipped with a motor stirrer, a thermometer, a dropping funnel and a reflux condenser was purged with nitrogen, and then dried with a heat gun. The flask was charged with 11.754 g (0.511 mol) of sodium metal and 35.5 cm$^3$ of toluene, and then heated in an oil bath at 133° C. to melt the sodium metal. The melted sodium metal was stirred vigorously for 20 minutes to obtain a sodium dispersion. 32.267 g (0.250 mol) of dichlorodimethylsilane was added dropwise to the sodium dispersion over 190 minutes while maintaining reflux conditions.

Since the viscosity of the liquid in the flask was increased, 10 cm$^3$ of toluene was added thereto. Then, the reflux conditions (the temperature of the oil bath: 125 to 130° C.) was maintained for 5 hours.

The liquid in the flask was cooled to room temperature. 45 ml of a diethyl ether solution containing 1.11 mol/L of methyllithium (methyllithium: 0.050 mol) was added dropwise thereto over 10 minutes. The mixture was stirred for 10 hours at room temperature. Then, the reflux conditions (the temperature of the oil bath: 80° C.) was maintained for 20 hours.

The liquid in the flask was cooled to room temperature. The liquid was distilled under ordinary pressure at an oil bath temperature of 90 to 95° C. to obtain 30 cm$^3$ of a distillate having a boiling point of 35 to 40° C.

The resultant bottom product was cooled to room temperature. A solution composed of 0.2 g of a surfactant (nonionic surfactant (polyoxyalkylene alkyl ether) HLB=14.1, cloud point 65° C., trade name: Newkalgen D-1110DIR, manufactured by Takemoto Oil & Fat Co., Ltd.) and 2 cm$^3$ of methanol was added dropwise thereto. Gas was vigorously generated while generating heat. After the completion of the dropwise addition, the resultant was stirred for 15 minutes. Then, 10 cm$^3$ of ion-exchanged water was added dropwise thereto over 5 minutes. Gas was vigorously generated while generating heat. After the completion of the dropwise addition, the resultant was stirred for 5 minutes. In addition, 80 cm$^3$ of ion-exchanged water was added dropwise thereto over 30 minutes. Heat and gas generation remitted. The resultant liquid was distilled under ordinary pressure to obtain a mixture distillate, which was composed of 51 cm$^3$ of an organic layer and 10.5 cm$^3$ of an aqueous layer and had a boiling point of 40~98° C. The resultant bottom product was stirred for 95 minutes at 50° C. The resultant liquid was cooled to room temperature.

The resultant liquid was subjected to suction filtration to obtain a solid content. 50 cm$^3$ of ion-exchanged water was added to the solid content, the resultant mixture was heated in an oil bath at 50° C. for 30 minutes, and then subjected to suction filtration to obtain a solid content. This process (water-washing) was repeated a total of three times. The pH of the filtrate became about 7.

50 cm$^3$ of methanol was added to the solid content washed with water and stirred for 1 hour at room temperature, and then the resultant liquid was subjected to suction filtration to obtain a solid content. This process (methanol-washing) was repeated a total of twice.

50 cm$^3$ of toluene was added to the solid content washed with methanol and stirred for 1 hour at room temperature, and then the resultant liquid was subjected to suction filtration to obtain a solid content. This process (toluene-washing) was repeated a total of four times.

30 cm$^3$ of methanol was added to the solid content washed with toluene and stirred for 1 hour at room temperature, and then the resultant liquid was subjected to suction filtration to obtain a solid content. The resultant solid content was dried in a vacuum for 325 minutes at room temperature. 12.142 g (yield of 83%) of a grayish powder product was obtained. The powder product was subjected to $^{29}$Si and $^{13}$C CP/MAS NMR analysis.

As shown in FIG. 1, signals in the vicinity of −43.5 ppm and 18.4 ppm, each of which were derived from a methoxy group and a hydroxy group, were at levels equal to or lower than the detection limits. Signals in the vicinity of −22.5 ppm and 7.9 ppm, each of which were derived from siloxane bonds, were at levels equal to or lower than the detection limits. On the other hand, signals (solid line arrows) in the vicinity of −41.5 ppm and −13.8 ppm, each of which were derived from trimethylsilyl groups, were detected.

Comparative Example 1

The inside of a four-necked flask equipped with a motor stirrer, a thermometer, a dropping funnel and a reflux condenser was purged with nitrogen, and then dried with a heat gun. The flask was charged with 11.755 g (0.511 mol) of sodium metal and 35.5 cm$^3$ of toluene, and then heated in an oil bath at 130° C. to melt the sodium metal. The melted sodium metal was stirred vigorously for 15 minutes to obtain a sodium dispersion. 32.27 g (0.250 mol) of dichlorodimethylsilane was added dropwise to the sodium dispersion over 240 minutes while maintaining reflux conditions. Then, the reflux conditions (the temperature of the oil bath: 125 to 130° C.) was maintained for 10 hours.

8.14 g (0.075 mol) of chlorotrimethylsilane and 1.767 g (0.07 mol) of sodium metal were added thereto. Then, the reflux conditions (the temperature of the oil bath: 125 to 130° C.) was maintained for 10 hours.

The liquid in the flask was cooled to room temperature. The liquid was distilled under ordinary pressure at an oil bath temperature of 130° C. to obtain 35 cm$^3$ of a distillate having a boiling point of 65 to 100° C.

The resultant bottom product was cooled to room temperature. A solution composed of 0.2 g of a surfactant (nonionic surfactant (polyoxyalkylene alkyl ether) HLB=14.1, cloud point 65° C., trade name: Newkalgen D-1110DIR, manufactured by Takemoto Oil & Fat Co., Ltd.) and 2 cm$^3$ of methanol was added dropwise thereto over 5 minutes. Heat was vigorously generated. After the completion of the dropwise addition, the resultant was stirred for 30 minutes. Then, 10 cm$^3$ of ion-exchanged water was added dropwise thereto over 20 minutes. Heat was vigorously generated. After the completion of the dropwise addition, the resultant was stirred for 5 minutes. In addition, 80 cm$^3$ of ion-exchanged water was added dropwise thereto over 45 minutes. Heat generation was remitted. The resultant liquid was distilled under ordinary pressure to obtain a mixture distillate, which was composed of 31 cm$^3$ of an organic layer and 18 cm$^3$ of an aqueous layer and had a boiling point of 80 to 97° C. The resultant bottom product was stirred for 75 minutes at 50° C. The resultant liquid was cooled to room temperature.

The resultant liquid was subjected to suction filtration to obtain a solid content. 50 cm$^3$ of ion-exchanged water was added to the solid content, and the resultant mixture was heated in an oil bath at 50° C. for 30 minutes and then was subjected to suction filtration to obtain a solid content. This process (water-washing) was repeated a total of five times. The pH of the filtrate became about 7.

30 cm$^3$ of methanol was added to the solid content washed with water and stirred for 1 hour at room temperature, and then the resultant liquid was subjected to suction filtration to obtain a solid content. This process (methanol-washing) was repeated a total of twice.

30 cm$^3$ of toluene was added to the solid content washed with methanol and stirred for 1 hour at room temperature, and then the resultant liquid was subjected to suction filtration to obtain a solid content. This process (toluene-washing) was repeated a total of five times.

30 cm$^3$ of methanol was added to the solid content washed with toluene and stirred for 1 hour at room temperature, and then the resultant liquid was subjected to suction filtration to obtain a solid content. The resultant solid content was dried in a vacuum for 240 minutes at room temperature. 10.764 g (yield of 74%) of a grayish powder product was obtained. The powder product was subjected to $^{29}$Si and $^{13}$C CP/MAS NMR analysis.

Figure 2:
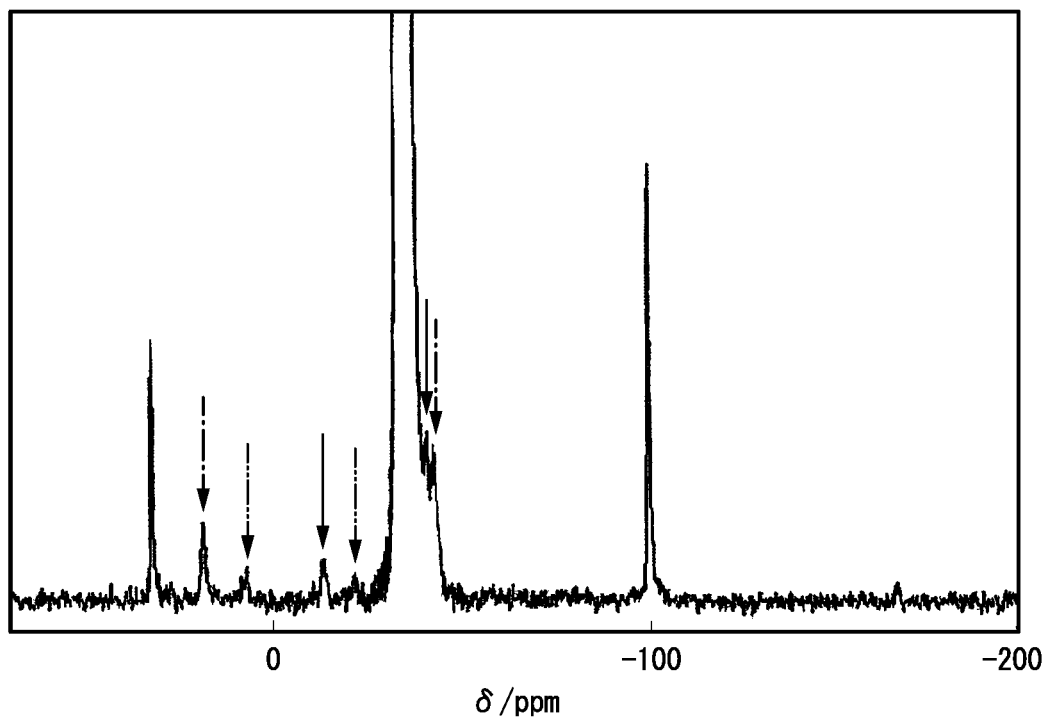
FIG. 2 is a drawing that indicates $^{29}$Si and $^{13}$C CP/MAS NMR analysis of an organic polysilane obtained in Comparative Example 1.

As shown in FIG. 2, signals (dot-and-dash line arrows) in the vicinity of −43.3 ppm and 18.6 ppm, each of which were derived from a methoxy group and a terminal silicon bonded with a hydroxy group, were detected. Signals in the vicinity of −22.3 ppm and 6.7 ppm, each of which were derived from siloxane bonds, were detected. Signals (solid line arrows) in the vicinity of −41.5 ppm and −13.8 ppm, each of which were derived from trimethylsilyl groups, were detected.

Comparative Example 2

The inside of a four-necked flask equipped with a motor stirrer, a thermometer, a dropping funnel and a reflux condenser was purged with nitrogen, and then dried with a heat gun. The flask was charged with 11.753 g (0.511 mol) of sodium metal and 35.5 cm$^3$ of toluene, and then heated in an oil bath at 130° C. to melt the sodium metal. The melted sodium metal was stirred vigorously for 27 minutes to obtain a sodium dispersion. 32.265 g (0.250 mol) of dichlorodimethylsilane was added dropwise to the sodium dispersion over 180 minutes while maintaining reflux conditions. Then, the reflux conditions (the temperature of the oil bath: 120 to 130° C.) was maintained for 10 hours.

The liquid in the flask was cooled to room temperature. 8.147 g (0.075 mol) of chlorotrimethylsilane and 1.760 g (0.077 mol) of sodium metal were added thereto. Then, 35 cm$^3$ of tetrahydrofuran was added dropwise thereto over 1 hour. Then, the reflux conditions (the temperature of the oil bath: 125 to 130° C.) was maintained for 20 hours.

The liquid in the flask was cooled to room temperature. The liquid was distilled under ordinary pressure at an oil bath temperature of 122 to 130° C. to obtain 47 cm$^3$ of a distillate having a boiling point of 62 to 85° C.

The resultant bottom product was cooled to room temperature. A solution composed of 0.2 g of a surfactant (nonionic surfactant (polyoxyalkylene alkyl ether) HLB=14.1, cloud point 65° C., trade name: Newkalgen D-1110DIR, manufactured by Takemoto Oil & Fat Co., Ltd.) and 2 cm$^3$ of methanol was added dropwise thereto over 2 minutes. Heat was slightly generated. After the completion of the dropwise addition, the resultant was stirred for 20 minutes. Then, 10 cm$^3$ of ion-exchanged water was added dropwise thereto over 25 minutes. Heat generation was vigorously occurred. After the completion of the dropwise addition, the resultant was stirred for 5 minutes. In addition, 100 cm$^3$ of ion-exchanged water was added dropwise thereto over 70 minutes. Heat generation was vigorously occurred. The resultant liquid was distilled under ordinary pressure to obtain a mixture distillate, which was composed of 28.5 cm$^3$ of an organic layer and 15.5 cm$^3$ of an aqueous layer and had a boiling point of 80 to 97° C. The resultant bottom product was stirred for 60 minutes at 50 to 55° C. The resultant liquid was cooled to room temperature.

The resultant liquid was subjected to suction filtration to obtain a solid content. 50 cm$^3$ of ion-exchanged water was added to the solid content, and the resultant mixture was heated in an oil bath at 50° C. for 30 minutes and then was subjected to suction filtration to obtain a solid content. This process (water-washing) was repeated a total of three times. The pH of the filtrate became about 7.

30 cm$^3$ of methanol was added to the solid content washed with water and stirred for 1 hour at room temperature, and then the resultant liquid was subjected to suction filtration to obtain a solid content. This process (methanol-washing) was repeated a total of twice.

30 cm$^3$ of toluene was added to the solid content washed with methanol and stirred for 1 hour at room temperature, and then the resultant liquid was subjected to suction filtration to obtain a solid content. This process (toluene-washing) was repeated a total of twice.

30 cm³ of methanol was added to the solid content washed with toluene and stirred for 1 hour at room temperature, and then the resultant liquid was subjected to suction filtration to obtain a solid content. The resultant solid content was dried in a vacuum for 360 minutes at room temperature. 12.467 g (yield of 85%) of a grayish powder product was obtained. The powder product was subjected to $^{29}$Si and $^{13}$C CP/MAS NMR analysis.

Figure 3:
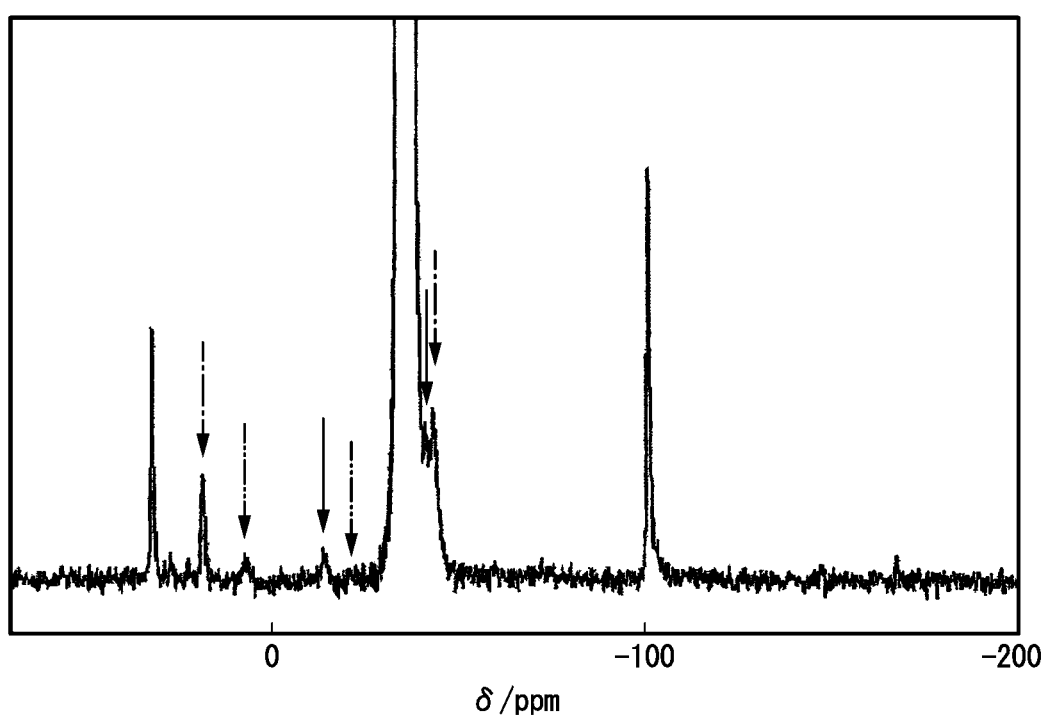
FIG. 3 is a drawing that indicates $^{29}$Si and $^{13}$C CP/MAS NMR analysis chart of an organic polysilane obtained in Comparative Example 2.

As shown in FIG. 3, signals (dot-and-dash line arrows) in the vicinity of −43.3 ppm and 18.7 ppm, each of which were derived from a methoxy group and a terminal silicon bonded with a hydroxy group, were detected. Signals (solid line arrows) in the vicinity of −41.1 ppm and −14.1 ppm, each of which were derived from trimethylsilyl groups, were detected.

INDUSTRIAL APPLICABILITY

The production method according to the present invention makes it possible to obtain an organic polysilane, which can produce signals respectively derived from a Si—O bond, an alkoxy group and a hydroxy group at levels equal to or lower than the detection limits in $^{29}$Si and $^{13}$C CP/MAS NMR analysis.

The invention claimed is:

1. A method for producing an organic polysilane, comprising:
   polymerizing an organic dihalosilane in an aprotic solvent in the presence of an alkali metal, an alkali earth metal, or a mixture of an alkali metal and an alkali earth metal to obtain a mixture comprising an organic polysilane having a terminal halogeno group;
   adding a solution comprising an organic lithium compound and an aprotic polar solvent to the mixture to inactivate the organic polysilane having the terminal halogeno group; and then
   adding a protic polar solvent thereto to deactivate the alkali metal and/or the alkali earth metal,
   wherein the organic dihalosilane is dimethyldichlorosilane or diphenyldichlorosilane.

2. The production method according to claim 1, wherein the organic lithium compound is an alkyl lithium.

3. The production method according to claim 1, wherein the aprotic polar solvent is diethyl ether.

4. The production method according to claim 1, further comprising:
   conducting solid-liquid separation after deactivating the alkali metal and/or the alkali earth metal;
   washing, with water, a solid content separated:
   separating, from water, the solid content washed with water;
   washing, with an alcohol, the solid content separated from water;
   separating, from the alcohol, the solid content washed with the alcohol;
   washing, with an aprotic solvent, the solid content separated from the alcohol;
   separating, from the aprotic solvent, the solid content washed with the aprotic solvent;
   washing, with another alcohol, the solid content separated from the aprotic solvent;
   separating, from the alcohol, the solid content washed with the alcohol; and then drying the solid content.

5. The production method according to claim 1, wherein the aprotic solvent is toluene.

6. The production method according to claim 1, wherein the organic dihalosilane is dimethyldichlorosilane.

7. The production method according to claim 6, wherein the organic lithium compound is methyl lithium.

8. The production method according to claim 7, wherein the aprotic polar solvent is an ethyl-based solvent.

9. The production method according to claim 8, wherein the aprotic polar solvent is diethyl ether.

10. The production method according to claim 8, further comprising:
    conducting solid-liquid separation after deactivating the alkali metal and/or the alkali earth metal;
    washing, with water, a solid content separated:
    separating, from water, the solid content washed with water;
    washing, with an alcohol, the solid content separated from water;
    separating, from the alcohol, the solid content washed with the alcohol;
    washing, with an aprotic solvent, the solid content separated from the alcohol;
    separating, from the aprotic solvent, the solid content washed with the aprotic solvent;
    washing, with another alcohol, the solid content separated from the aprotic solvent;
    separating, from the alcohol, the solid content washed with the alcohol; and then drying the solid content.

11. The production method according to claim 8, wherein the aprotic solvent is toluene.

12. The production method according to claim 8, wherein the protic polar solvent is methanol.

* * * * *